United States Patent [19]

Day

[11] Patent Number: 4,651,562

[45] Date of Patent: Mar. 24, 1987

[54] SOC SIGNAL ANALYSIS

[75] Inventor: Eric Day, Longmeadow, Mass.

[73] Assignee: United Technologies Diesel Systems, Inc., Springfield, Mass.

[21] Appl. No.: 844,054

[22] Filed: Mar. 26, 1986

[51] Int. Cl.⁴ .................................. G01M 15/00
[52] U.S. Cl. ........................................... 73/116
[58] Field of Search ................ 73/117.3, 116, 119 R, 73/119 A; 123/478, 486; 431/13

[56] References Cited

U.S. PATENT DOCUMENTS

| | | | |
|---|---|---|---|
| 3,067,610 | 12/1962 | Bockemuehl et al. | 73/116 |
| 4,424,568 | 1/1984 | Nishimura et al. | 123/492 |
| 4,463,729 | 8/1984 | Bullis et al. | 123/478 |
| 4,583,507 | 4/1986 | Greeves et al. | 73/116 |

FOREIGN PATENT DOCUMENTS

| | | | |
|---|---|---|---|
| 3105001 | 8/1982 | Fed. Rep. of Germany | 73/116 |
| 2131177 | 6/1984 | United Kingdom | 73/116 |
| 0939804 | 6/1982 | U.S.S.R. | 73/119 A |

Primary Examiner—Stewart J. Levy
Assistant Examiner—Robert R. Raevis
Attorney, Agent, or Firm—Gerald E. Linden

[57] ABSTRACT

According to the invention, the time for start of combustion in an engine cylinder is provided by disposing a sensor in the combustion chamber of the cylinder, said sensor providing a signal indicative of the amplitude/time of the combustion event within the cylinder. Two signal levels are measured, a first level which is above the noise in the signal and a second level which is below the maximum amplitude of the signal which may be attenuated by carbon buildup on the sensor. By extrapolating backwards from these two sensed levels, a reference time for start of combustion is calculated.

7 Claims, 2 Drawing Figures

SOC SIGNAL ANALYSIS

TECHNICAL FIELD OF THE INVENTION

The invention relates to processing the Start of Combustion (SOC) signal from a SOC sensor, as applied to fuel injection control.

BACKGROUND OF THE INVENTION

Commonly-owned U.S. Pat. No. 4,463,729 (Bullis et al, 1984) discloses a start of combustion (SOC) sensor that provides a SOC signal indicative of the onset of combustion event. The SOC sensor is an optical device disposed in the combustion chamber.

The SOC signal is advantageously supplied to a timing control circuit which delivers a timing control signal to a fuel delivery device, such as the controller associated with a fuel pump. The control circuit stores one or more start of combustion values which indicate the desired timing, relative to an engine cycle, for the start of combustion event as a function of speed and load. One or more adjustment signals are stored and applied as a function of speed and load to adjust the desired signal such that the control signal is corrected for delays. The actual SOC signal is compared with the desired signal to generate an error signal which may be used to finely adjust the stored SOC signal for particular speed and load conditions. This patent is incorporated by reference herein.

DISCLOSURE OF THE INVENTION

It is an object of this invention to provide a technique for analyzing the SOC signal to determine the actual time that combustion starts within the cylinder of an engine.

According to the invention, the actual time for start of combustion in an engine cylinder is provided by disposing a sensor in the combustion chamber of the cylinder, said sensor providing a signal indicative of the amplitude/time of the combustion event within the cylinder. Two signal levels are measured, a first level which is above the noise in the signal and a second level which is below the maximum amplitude of the signal which may be attenuated by carbon buildup on the sensor. By extrapolating backwards from these two sensed levels, the actual time for the start of combustion is calculated.

Other objects, features and advantages of the invention will become apparent in light of the following description thereof.

BEST MODE FOR CARRYING OUT THE INVENTION

Figure 1:
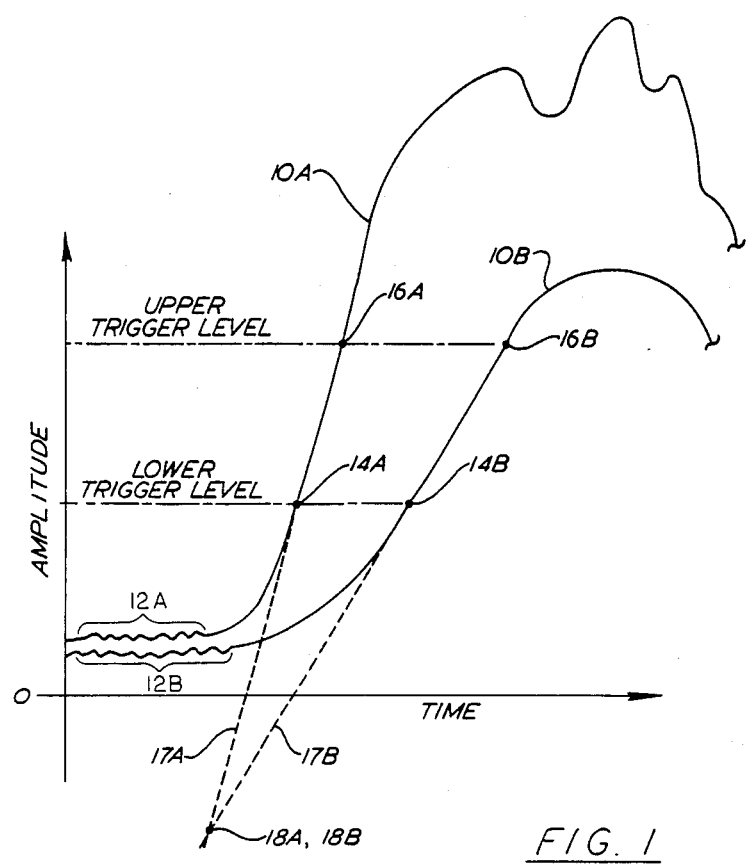
FIG. 1 is a graph of weak and strong SOC sensor signals. Particular points thereon illustrate the method of this invention.

FIG. 1 shows signals 10A and 10B that may be provided by a SOC sensor. The signal 10A is a strong signal. The signal 10B is a weak signal. The signal slope and amplitude varies with the attenuation of the optical output of the SOC sensor due to carbon buildup on the SOC sensor in the combustion chamber.

A portion 12A,12B of the signals 10A,10B represents noise. The critical point to be determined on the signals 10A and 10B is the actual start of combustion. A rise in the signal amplitude occurs as a result of combustion, but the actual movement that this rise occurs is indeterminate.

In this invention, the actual start of combustion is determined indirectly by measuring two points on the signal 10A,10B. A first point 14A,14B is measured at a predetermined lower trigger level which is about the electrical noise and background noise level 12A,12B in the signal 10A,10B. A second point 16A,16B is measured at a predetermined upper trigger level which is above the lower trigger level and below the maximum amplitude of the weakest signals (10B). Since the level of the upper and lower trigger levels is fixed, by measuring the time interval between these two events it is possible to extrapolate (linearly) backwards in time from the points 14A,14B and 16A,16B (as indicated by the dashed lines 17A,17B) to a reference level, i.e., to the "hypothetical" (calculated, not directly measured) time for the rising edge of the SOC signal. This time, which is represented by the points 18A,18B and which is indicative of the moment at which combustion started in the cylinder is converted to an engine crankshaft angle and is used in the closed loop control of the aforementioned U.S. Pat. No. 4,463,729.

It should be noted that the signal levels 14A,14B and 16A,16B have been carefully chosen so that the backwards extrapolations from either signal 10A or 10B are convergent in most cases, and hence so that the points 18A and 18B are coincident. This establishes a valid calculation for the hypothetical time which is consistently related to the actual start of combustion time over a range of SOC signal strengths.

Figure 2:
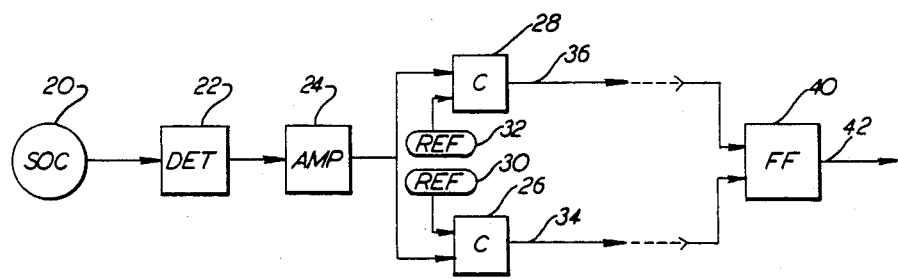
FIG. 2 is a block diagram of apparatus for implementing the invention shown with respect to FIG. 1.

FIG. 2 shows a circuit for sensing the two points 14A,14B and 16A,16B. The SOC sensor 20 provides an optical signal to a photodetector 22, the output of which is amplified by an amplifier 24 to increase the signal strength. The output of the amplifier is provided to two comparators 26 and 28, for comparing the amplified SOC signal against two predetermined reference levels 30 and 32, respectively.

The comparator 26 provides an output on a line 34 when the amplified SOC signal is at the lower trigger level (14A,14B), and the comparator 28 provides an output on a line 36 when the amplified SOC signal is at the upper threshold level (16A,16B). The signals on the lines 34 and 36 are provided to the interrupt inputs of a microprocessor that is suited to receive two such inputs for performing the aforementioned extrapolation.

In the event that the particular microprocessor employed has only one interrupt input, the signals on the lines 34 and 36 are provided to the two inputs of a flip-flop circuit 40, the subsequent output of which will be a pulse in a line 42 representative of the measured time between the points 14A,14B and the points 16A,16B. The line 42 is connected to the signal input of the microprocessor.

It has been deemed useful to configure the control software in the microprocessor so that if the higher trigger level (16A,16B) is not received, or if the time interval between the lower trigger level (14A,14B) and the higher trigger level (16A,16B) is greater than a preset maximum, to ignore the present data and revert to a suitable backup for fuel pump timing control, such as the latest good value for start of combustion or a control algorithm that is independent of SOC. This eliminates the use of SOC signals outside of the normal operating range and may also be used to aid in system self-health diagnostics.

Similarly, the microprocessor software should be configured such that spurious signals occuring outside of a specified engine operating range (i.e., 10 degrees BTDC to 10 degrees ATDC) are ignored.

I claim:

1. A method of determining the time when combustion starts in the cylinder of an engine, comprising:
    disposing a sensor in the combustion chamber of the cylinder, said sensor providing a signal indicative of the amplitude of the combustion event within the cylinder;
    characterized by:
    measuring the time that the signal reaches a first amplitude which is above the electrical noise and background radiation in the signal;
    measuring the time that the signal reaches a second amplitude which is below the maximum amplitude of the signal as attenuated by carbon buildup on the sensor; and
    extrapolating backwards in time from the second amplitude through the first amplitude to determine the moment at which combustion started in the cylinder.

2. A method according to claim 1, characterized by:
    not performing the extrapolation if the second amplitude is not reached by the signal.

3. A method according to claim 1, characterized by:
    not performing the extrapolation if the time interval between the first and second amplitudes exceeds a predetermined value.

4. A method according to claim 1, characterized by:
    not performing the extrapolation if the first amplitude is measured at a time falling outside of a specified engine operating range.

5. A method according to claim 4, characterized in that the specified engine operating range is from 10 degree BTDC to 10 degrees ATDC for the cylinder.

6. Apparatus for determining the time when combustion starts in the cylinder of the engine, comprising:
    a sensor (20) disposed in the combustion chamber of the cylinder, said sensor providing a signal indicative of the amplitude of the combustion event within the cylinder;
    a first comparator responsive to the signal for providing a first output when the signal reaches a first amplitude;
    a second comparator responsive to the signal for providing a second output when the signal reaches a second amplitude greater than the first amplitude; and
    means for determining the time when combustion starts in the engine based on an extrapolation backwards in time from the second output through the first output.

7. Apparatus according to claim 6, wherein the means for determining the time when combustion starts in the engine includes
    a flip-flop responsive to the outputs of the first and second comparators for providing a pulse indicative of the measured time between the first and second comparator outputs.

* * * * *